(12) United States Patent
Renes et al.

(10) Patent No.: US 11,847,938 B2
(45) Date of Patent: Dec. 19, 2023

(54) COMBINING REGULAR AND SYMBOLIC NTTS USING CO-PROCESSORS

(71) Applicant: NXP B.V., Eindhoven (NL)

(72) Inventors: Joost Roland Renes, Eindhoven (NL); Joppe Willem Bos, Wijgmaal (BE); Christine van Vredendaal, Veldhoven (NL); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 17/392,332

(22) Filed: Aug. 3, 2021

(65) Prior Publication Data

US 2023/0047965 A1    Feb. 16, 2023

(51) Int. Cl.
  *G09C 1/00*   (2006.01)
  *G06F 7/523*  (2006.01)

(52) U.S. Cl.
  CPC ............... *G09C 1/00* (2013.01); *G06F 7/523* (2013.01)

(58) Field of Classification Search
  CPC ........... G09C 1/00; G06F 7/523; G06F 7/722; H04L 9/3093
  See application file for complete search history.

(56) References Cited

U.S. PATENT DOCUMENTS

| | | | |
|---|---|---|---|
| 8,477,935 B2 | 7/2013 | Langendoerfer et al. | |
| 2007/0136409 A1 | 6/2007 | Tonomura et al. | |
| 2015/0033025 A1* | 1/2015 | Hoffstein | H04L 9/3026 713/176 |

(Continued)

FOREIGN PATENT DOCUMENTS

| | | |
|---|---|---|
| CN | 110519058 A | 11/2019 |
| KR | 101952547 B1 | 11/2018 |

OTHER PUBLICATIONS

James W. Cooley, et al., "An Algorithm for the Machine Calculation of Complex Fourier Series," Mathematics of Computation, vol. 19, No. 90. (Apr. 1965), 6 pgs.

(Continued)

*Primary Examiner* — Lynn D Feild
*Assistant Examiner* — Abdullah Almamun

(57) ABSTRACT

Various embodiments relate to a method for multiplying a first and a second polynomial in a ring $\mathbb{F}_q[X]/(X^n+1)$ where q is a positive integer. The method comprising: mapping the first polynomial into k smaller third polynomials over k smaller rings based upon primitive roots of unity, where k is a positive integer; mapping the second polynomial into k smaller fourth polynomials over the k smaller rings based upon primitive roots of unity; applying an isomorphism to the k third polynomials resulting in k fifth polynomials; applying the isomorphism to the k fourth polynomials resulting in k sixth polynomials; applying a Kronecker substitution on the k fifth polynomials and the k sixth polynomials and perform the multiplication of the k fifth polynomials and the k sixth polynomials to produce a multiplication result; applying an inverse of the isomorphism to the multiplication result to obtain the multiplication of the first polynomial and the second polynomial; and mapping the k inverted polynomials to a single polynomial in the ring.

14 Claims, 2 Drawing Sheets

(56) References Cited

U.S. PATENT DOCUMENTS

2019/0312728 A1* 10/2019 Poeppelmann ....... H04L 9/3093
2019/0363871 A1* 11/2019 Cheon ................... H04L 9/304
2020/0082738 A1* 3/2020 Poeppelmann ......... H04L 9/002
2020/0265167 A1* 8/2020 Banerjee ................ G06F 21/72

OTHER PUBLICATIONS

David Harvey, "Faster Polynomial Multiplication via Multipoint Kronecker Substitution," Journal of Symbolic Computation 44 (2009), 9 pgs.

Martin R. Albrecht, et al., "Implementing RLWE-based Schemes Using an RSA Co-Processor," IACR Transactions on Cryptographic Hardware and Embedded Systems, (2016) vol. 0, No. 0, p. 1-40.

Niedersachsische Staats—Und Universita.Tsbibliothek Gottingen; Journal fur die reine und angewandte Mathematik; 127 pgs.

On Lattices, Learning with Errors, Random Linear Codes, and Cryptography by Oded Regev; May 2, 2009; 37 pgs.

Computer Security Resource Center: Post-Quantum Cryptography; created Jan. 3, 2017, updated Jan. 11, 2021; 2 pgs.

On Ideal Lattices and Learning with Errors over Rings by Vadim Lyubashevsky et al., 23 pgs.

Asymptotically Fast Algorithns for T-E Numerical Nuztiplication and Division of Polynoniai~ With COE~LEX Coefficients by Arnold Schonhage; 1982;13 pgs.

Arnold Schonhage, "Schnelle Multiplikation von Polynomen," 1977; 4 pgs.

J.M. Pollard, "The Fast Fourier Transform in a Finite Field," Mathematics of Computation, vol. 25, No. 114, Apr. 1971: 10 pgs.

Arnold Schonhage, "Asymptotically Fast Algorithms for the Numerical Multiplication and Division of Polynomials with Complex Coefficients," 982;13 pgs.

* cited by examiner

COMBINING REGULAR AND SYMBOLIC NTTS USING CO-PROCESSORS

TECHNICAL FIELD

Various exemplary embodiments disclosed herein relate generally to combining regular and symbolic NTTs using co-processors.

BACKGROUND

The development of quantum computers threatens the security of certain currently widely used public key cryptography algorithms such as the RSA (Rivest-Shamir-Adleman) algorithm. Most recently, advances in quantum computing have accelerated the research into "post-quantum cryptography" schemes, that is, new cryptography schemes that are believed to be secure even when faced with an attacker using a quantum computer. There are various families of problems that are being considered to instantiate these post-quantum cryptographic approaches. One approach is based on the hardness of certain lattice problems. That is, solving these difficult lattice problems compromises the cryptographic security. When implemented, computationally expensive operations of some proposed lattice-based post-quantum cryptography schemes include arithmetic with polynomials with integer coefficients. Some currently used public-key cryptography algorithms require arithmetic of large integers, where the integers may include hundreds or thousands of bits. In contrast, the coefficients used for polynomial multiplication for lattice-based algorithms may be much smaller, e.g., 32 bits or less. Typically, special purpose processors are implemented in a data processing system to offload the computationally difficult problems from the main processor of the system. However, the special purpose co-processors currently used to implement existing RSA or Elliptic-curve cryptography (ECC) algorithms cannot efficiently and quickly perform the polynomial multiplications required for lattice-based cryptography. Developing new special-purpose co-processors to perform the computations needed by lattice-based post-quantum cryptography efficiently and quickly is expensive and time consuming.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for multiplying a first and a second polynomial in a ring $\mathbb{F}_q[X]/(X^n+1)$ to perform a cryptographic operation in a data processing system where q is a positive integer, the method for use in a processor of the data processing system, including: receiving the first polynomial and the second polynomial by the processor; mapping the first polynomial into k smaller third polynomials over k smaller rings based upon primitive roots of unity, where k is a positive integer; mapping the second polynomial into k smaller fourth polynomials over the k smaller rings based upon primitive roots of unity; applying an isomorphism to the k third polynomials resulting in k fifth polynomials; applying the isomorphism to the k fourth polynomials resulting in k sixth polynomials; applying a Kronecker substitution on the k fifth polynomials and the k sixth polynomials and perform the multiplication of the k fifth polynomials and the k sixth polynomials to produce a multiplication result; applying an inverse of the isomorphism to the multiplication result to obtain the multiplication of the first polynomial and the second polynomial; and mapping the k inverted polynomials to a single polynomial in the ring mapping the k inverted polynomials to a single polynomial in the ring $\mathbb{F}_q[X]/(X^n+1)$.

Various embodiments are described, wherein mapping the first polynomial into k smaller third polynomials over k smaller rings includes the following mapping of the ring $\mathbb{F}_q[X]/(X^n+1)$: $NTT_k$: $\mathbb{F}_q[X]/(X^n+1) \to \Pi_{i=0}^{k-1} \mathbb{F}_q[X]/(X^{n/k}-\zeta_{2k}^{2i+1})$, where $NTT_k$ is number theoretic transform and $\zeta_{2k}^{2i+1}$ is a primitive root of unity.

Various embodiments are described, wherein mapping the first polynomial into k smaller third polynomials over k smaller rings includes the following mapping of the first polynomial f: $f \mapsto (f(\zeta^1), \ldots, f(\zeta^{2n-1}))$.

Various embodiments are described, wherein mapping the first polynomial into k smaller third polynomials over k smaller rings includes the following mapping of the first polynomial f: $f \mapsto (f \bmod (X^{n/k}-\zeta_{2k}), \ldots, f \bmod (X^{n/k}-\zeta_{2k}^{2k-1}))$.

Various embodiments are described, wherein applying a Kronecker substitution on the k fifth polynomials and the k sixth polynomials includes applying the Kronecker substitution k times on polynomials of degree n/k.

Various embodiments are described, wherein applying an isomorphism if includes a ring mapping: $\mathbb{F}_q[X]/(X^{n/k}-\zeta_{2k}^{2i+1}) \to \mathbb{F}_q[X]/(X^{n/k}+1)$; and a polynomial mapping: $f_i \mapsto f_i(X/(\zeta^{2i+1}))$.

Various embodiments are described, wherein applying the inverse of the isomorphism $\psi_i^{-1}$ includes: $\psi_i^{-1}: \tilde{f}_i \mapsto (\zeta^{2i+1} \cdot X)$.

Further various embodiments relate to a data processing system comprising instructions embodied in a non-transitory computer readable medium, the instructions for multiplying a first and a second polynomial in the ring $\mathbb{F}_q[X]/(X^N+1)$ to perform a cryptographic operation in a processor, the instructions, including: instructions for receiving the first polynomial and the second polynomial by the processor; instructions for mapping the first polynomial into k smaller third polynomials over k smaller rings based upon primitive roots of unity, where k is a positive integer; instructions for mapping the second polynomial into k smaller fourth polynomials over the k smaller rings based upon primitive roots of unity; instructions for applying an isomorphism to the k third polynomials resulting in k fifth polynomials; instructions for applying the isomorphism to the k fourth polynomials resulting in k sixth polynomials; instructions for applying a Kronecker substitution on the k fifth polynomials and the k sixth polynomials and perform the multiplication of the k fifth polynomials and the k sixth polynomials to produce a multiplication result; instructions for applying an inverse of the isomorphism to the multiplication result to obtain the multiplication of the first polynomial and the second polynomial; and instructions for mapping the k inverted polynomials to a single polynomial in the ring $\mathbb{F}_q[X]/(X^n+1)$.

Various embodiments are described, wherein mapping the first polynomial into k smaller third polynomials over k smaller rings includes the following mapping of the ring $\mathbb{F}_q[X]/(X^n+1)$: $NTT_k$: $\mathbb{F}_q[X]/(X^n+1) \to \Pi_{i=0}^{k-1} \mathbb{F}_q[X]/(X^{n/k}-\zeta_{2k}^{2i+1})$ where $NTT_k$ is number theoretic transform and $\zeta_{2k}^{2i+1}$ is a primitive root of unity.

Various embodiments are described, wherein mapping the first polynomial into k smaller third polynomials over k smaller rings includes the following mapping of the first polynomial f: $f \mapsto (f(\zeta^1), \ldots, f(\zeta^{2n-1}))$.

Various embodiments are described, wherein mapping the first polynomial into k smaller third polynomials over k smaller rings includes the following mapping of the first polynomial f: $f \mapsto (f \mod (X^{n/k} - \zeta_{2k}), \ldots, f \mod (X^{n/k} - \zeta_{2k}^{2k-1}))$.

Various embodiments are described, wherein applying a Kronecker substitution on the k fifth polynomials and the k sixth polynomials includes applying the Kronecker substitution k times on polynomials of degree n/k.

Various embodiments are described, wherein applying an isomorphism $\psi_i$ includes a ring mapping: $\mathbb{F}_q[X]/(X^{n/k} - \zeta_{2k}^{2i+1}) \to \mathbb{F}_q[X]/(X^{n/k}+1)$; and a polynomial mapping: $f_i \mapsto f_i(X/(\zeta^{2i+1}))$.

Various embodiments are described, wherein applying the inverse of the isomorphism $\psi_i^{-1}$ includes: $\psi_i^{-1}: \bar{f}_i \mapsto \bar{f}_i(\zeta^{2i+1} \cdot X)$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
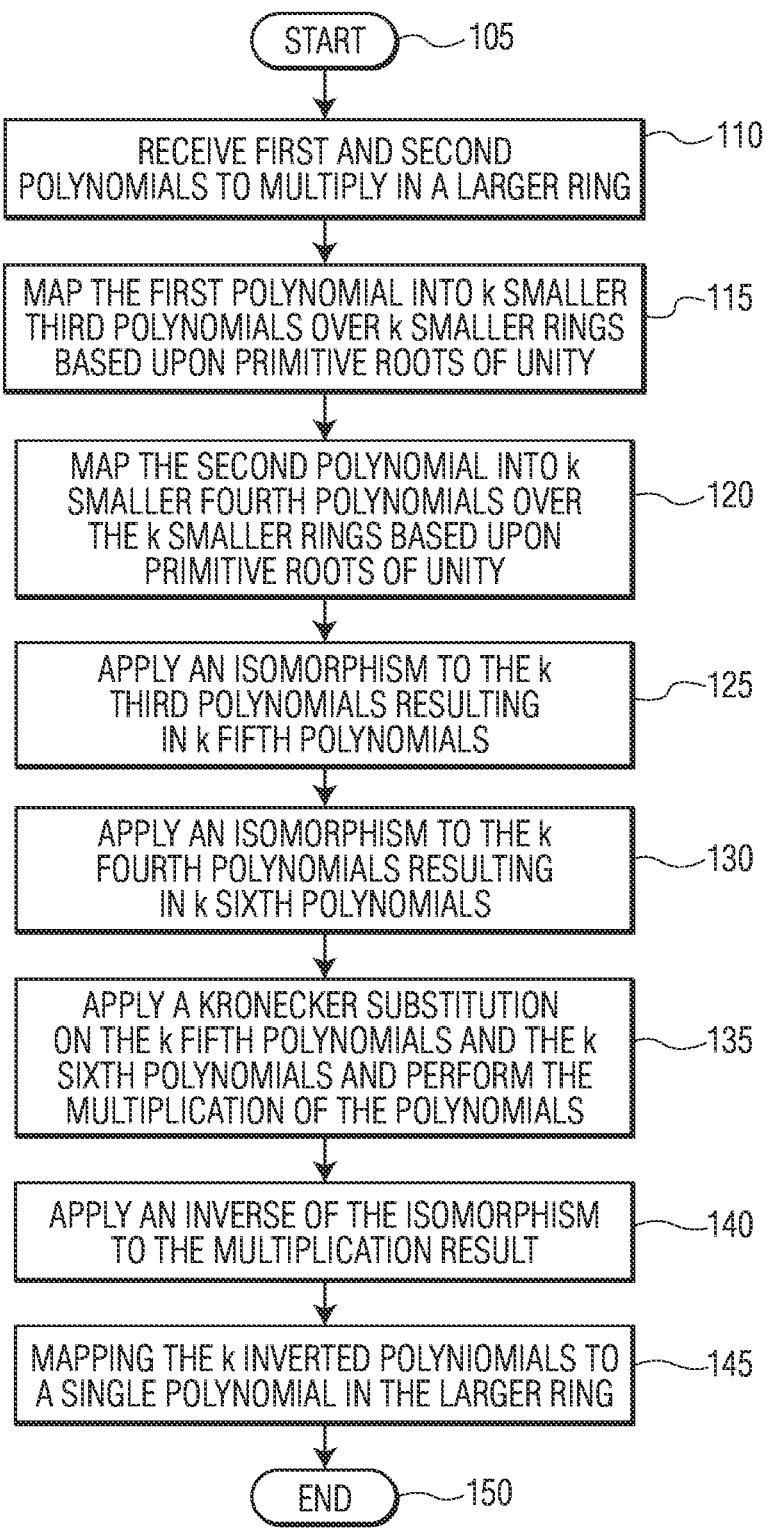
FIG. 1 illustrates a flow diagram for performing the multiplication of two polynomials by a processor.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are various different families of problems to instantiate post-quantum cryptographic approaches. Constructions based on the hardness of lattice problems are considered to be one of the most promising candidates to become the next standard. Most approaches considered within this family are a generalization of the learning with errors (LWE) framework and the ring-learning with errors problem.

When implemented, the main computationally expensive operations are arithmetic with polynomials with integer coefficients. For the purposes of this document, computations are done in a ring $R_q = \mathbb{F}_q[X]/(X^n+1)$ for positive integers q and n: the coefficients of the polynomial are in a finite ring of size q, denoted $\mathbb{F}_q$, while the polynomial arithmetic is modulo $X^n+1$. In contrast to other popular classical public-key cryptography where arithmetic of large integers is needed (on hundreds or thousands of bits) the value of q is much smaller: smaller than 32 bits. This makes the hardware accelerators developed and deployed for classical public-key cryptography obsolete since they cannot directly be used for polynomial multiplication with small coefficients.

Lattice-based cryptography supports various commonly used cryptographic functionality such as exchanging secret keys, digital signatures, encryption, and decryption. In addition, lattice-based cryptography supports other cryptographic functionality such as homomorphic encryption, and the like. Lattice-based cryptography has many practical applications such as establishing secure connections over a network (e.g., the internet), guaranteeing the integrity of software (e.g., when updating or booting a device) and performing cryptographic operations on encrypted data in the cloud. When implemented in either hardware or software, many lattice-based constructions work on polynomials that are generated from random user input or publicly known seeds to enhance performance and reduce memory requirements. For example, in various lattice-based cryptographic schemes, such as for example, an asymmetric cryptography scheme using a pair of keys, a user's private key of the key pair includes a vector of polynomials having coefficients that are sampled randomly. A public key of the key pair is a matrix of polynomials having coefficients that are either public or generated from a public seed. The longest arithmetic operations carried out by these implementations are multiplications involving two polynomials, and the operations may be repeated several times. The polynomials typically have a fixed, or finite, number of coefficients, while the coefficients themselves lie in a modular ring, such as the integers modulo a prime or a power of two. These are properties of the particular cryptographic scheme and are fixed by parameters of the scheme. Therefore, a need exists for a method to multiply two polynomials for a cryptographic application efficiently using existing co-processors.

Number Theoretic Transforms (NTTs) are often used in cryptographic systems to reduce the amount of computing required in evaluating the cryptographic function. Although NTTs come in various shapes and forms, the focus here is on the setting the coefficient ring as a finite field $\mathbb{F}_q$ of prime order q, and polynomials are taken modulo $X^n+1$ for some n such that $2n|q-1$. That is, the operations are in the ring $R_q = \mathbb{F}_q[X]/(X^n+1)$. Let $\zeta$ be a 2n-th primitive root of unity, which exists because $2n|q-1$, and $\mathbb{F}'_q$ is a cyclic group of order q-1. It follows that $\zeta$ is also a principal root of unity because the only square roots of 1 in $\mathbb{F}_q$ are 1 and -1. It follows that $X^n+1=(X-\zeta)(X-\zeta^3)\ldots(X-\zeta^{2n-1})$ and therefore that $$NTT: \mathbb{F}_q[X]/(X^n+1) \to \prod_{i=0}^{n-1} \mathbb{F}_q[X]/(X-\zeta^{2i+1})$$

$$f \mapsto (f(\zeta^1), \ldots, f(\zeta^{2n-1}))$$

is an isomorphism by the Chinese Remainder Theorem (CRT). Clearly the order of the product can change without repercussions, and this is often done to simplify implementation (using bit reversals). It can be computed with complexity O(n log (n)) using Cooley-Tukey butterflies, and so can its inverse $NTT^{-1}$.

Similarly, one may use a primitive, and therefore principal, 2k-th root of unity $\zeta_{2k}=\zeta^{n/k}$ for some positive integer k|n. In that case, $X^n+1=(X^{n/k}-\zeta_{2k})(X^{n/k}-\zeta_{2k}^3) \ldots (X^{n/k}-\zeta_{2k}^{2k-1})$ and by the CRT it follows that $$NTT_k: \mathbb{F}_q[X]/(X^n+1) \to \prod_{i=0}^{k-1} \mathbb{F}_q[X]/(X^{n/k}-\zeta_{2k}^{2i+1})$$

$$f \mapsto (f \bmod (X^{n/k}-\zeta_{2k}), \ldots, f \bmod (X^{n/k}-\zeta_{2k}^{2k-1})).$$

This splits up the original polynomial of degree n into k polynomials of degree n/k each. This is a generalization of the case above, and for k=n the functions are equivalent. This (and its inverse) may be computed with butterfly algorithms with complexity O(n log(k)). These may be called intermediate or early-abort NTTs. These require only that 2k|q−1 as opposed to 2n|q−1, which is a weaker requirement on q.

By the convolution theorem it is known that $$f \cdot g = NTT_k^{-1}(NTT_k(f) \cdot NTT_k(g))$$

for each such k and polynomials f, g ∈ $\mathbb{F}_q[X]/(X^n+1)$, and in particular that $$NTT_k^{-1}(NTT_k(f) \cdot NTT_k(g)) = NT\tau_\ell^{-1}(NT\tau_\ell(f) \cdot NT\tau_\ell(g))$$

for each ℓ|n. In other words, the choice of k has no impact on the result of polynomial multiplication.

The application of Kronecker substitution to symbolic NTTs will now be discussed. In 1882, Kronecker introduced a method to reduce computational problems related to multivariate polynomials to univariate polynomials. A hundred years later, a similar technique was introduced by Schönhage to reduce polynomial multiplications in $\mathbb{Z}$ [X] to integer multiplication (multiplications in $\mathbb{Z}$). This approach is known as the Kronecker substitution method.

Given two polynomials f, g ∈ $\mathbb{Z}$ [X] of degree (up to) N−1 ∈ $\mathbb{Z}$, the goal is to compute the polynomial multiplication h=f·g. The idea is to evaluate the polynomials at a sufficiently high power of two (e.g., $f(2^\ell)$ and $g(2^\ell)$) and use the resulting integers as input for a regular integer multiplication by computing $h(2^\ell)=f(2^\ell) \cdot g(2^\ell)$. Finally, the resulting integer $h(2^\ell)$ is converted back to its polynomial representation h. The result is correct if the coefficients of the resulting polynomial did not "mix" with each other, i.e., if the parameter ℓ ∈ $\mathbb{Z}$ is sufficiently large.

The main advantage of this approach, computing a polynomial multiplication with an integer multiplication, is that well-studied and fast implementations of asymptotic integer multiplication methods may be used.

Applying Kronecker with symbolic NTTs to $\mathbb{Z}$ [X]/(X$^n$+1) will now be described. In U.S. patent application Ser. No. 16/884,136 filed on May 27, 2020 to Joost R. Renes et al. entitled "Method For Multiplying Polynomials For A Cryptographic Operation" (hereafter "Renes 1"), the observation is made that $\zeta=X^{2n/t}$ is a principal t-th root of unity in the ring $\mathbb{Z}$ [X]/(X$^n$+1). Hence the ℓ n-bit multiplication can now be reduced through Kronecker to t multiplications of ℓ n/t bits each. Using the notation from above, the cost goes from M(ℓ ·n)+O(ℓ ·n) to t·M(ℓ ·n/t)+O(ℓ ·n). This is done by evaluating f and g at $\zeta^i \cdot 2^{\ell/t}$ for i=0, 1, ... t−1 as opposed to only $2^\ell$ and multiplying the respective factors modulo $X^{n/t}+1$. Renes 1 is incorporated by reference for all purposes as if included herein.

More specifically, the integers $$h(\zeta^i 2^{\ell/t}) = f(\zeta^i 2^{\ell/t}) \cdot g(\zeta^i 2^{\ell/t}) \bmod (2^{\ell n/t}+1), 0 \le i \le t-1,$$

are computed and it is noted that $$h^{(i)}(2^\ell) \equiv \frac{\sum_{j=0}^{t-1} \zeta^{i(t-j)} h(\zeta^j \cdot 2^{\ell_t})}{2^{i\ell_t} \cdot t} \bmod (2^{\ell_t n}+1),$$

where $$h^{(i)}(2^\ell) = \sum_{j=0}^{n/t-1} h_{2tj+i} 2^{k\ell}.$$

To recover h, the appropriate ℓ -bit limbs can be read off from the $h^{(i)}$.

In lattice based cryptography protocols, the main arithmetic operations used include polynomial multiplication in the ring $\mathbb{F}_q[X]/(X^n+1)$ where q and n are positive integers. This makes it hard to directly apply the existing fast and hardened arithmetic co-processors designed for classical public-key cryptography such as ECC and RSA. Renes 1 demonstrates how one can apply an improved version of Kronecker substitution in $\mathbb{F}_q[X]/(X^n+1)$ to re-use the arithmetic co-processors. Subsequently, U.S. patent application Ser. No. 17/190,986 filed on Mar. 3, 2021 to Joost R. Renes et al. entitled "Method For Multiplying Polynomials for a Cryptographic Operation" (hereafter "Renes 2"), demonstrates how to apply the same technique in rings of the form $\mathbb{F}_q[X]/(X^n-1)$. Renes 2 is incorporated by reference for all purposes as if included herein. Embodiments that generalize this further to rings of the form $\mathbb{F}_q[X]/(X^{n/k}-\zeta_{2k})$, where $\zeta_{2k}$ is a primitive principal 2k-th root of unity will now be described. The case k=1 recovers the original setting of Renes 1.

The main benefit of the embodiments described herein is that this allows for the combination the ideas of Renes 1 with regular NTTs. As described above, the partial NTT function $NTT_k$ maps a polynomial f∈ $\mathbb{F}_q[X]/(X^n+1)$ into the product of rings:

$$NTT_k(f) \in \prod_{i=0}^{k-1} \mathbb{F}_q[X]/(X^{n/k}-\zeta_{2k}^{2i+1}),$$

where each of the $\zeta_{2k}^{2i+1}$ is a 2k-th principal root of unity. The algorithm of Renes 1 may be applied to each of these rings separately.

This advantage can be further illustrated as follows: with Renes 1 a single (ℓ n)-bit multiplication may be reduced to t multiplications of ℓ n/t bits each, assuming that t|n and t|ℓ. On the other hand, combining NTTs with Kronecker substitution, the function $NTT_k$ reduces a single (ℓ n)-bit multiplication to k multiplications of ℓ n/k bits each, assuming that 2k|q−1. Note that the requirements on the two different approaches are independent: those of Renes 1 rely only on the degree of the polynomials and the Kronecker substitution parameter, while the NTT only restricts the coefficient ring. Therefore, combining the two, an (ℓ n)-bit multiplication may be reduced to tk multiplications of ℓ n/(tk) bits each. This means that either the depth may be increased, or a given depth may be achieved with fewer restrictions on q, n and ℓ.

There are two essential features of the embodiments described herein. First, the use of Renes 1 is generalized to rings of the form $\mathbb{F}_q[X]/(X^{n/k}-\zeta_{2k})$, where $\zeta_{2k}$ is a primitive (and principal) 2k-th root of unity. Second, the idea is to combine the Kronecker substitution-based method from Renes 1 with a regular NTT based on roots of unity of $\mathbb{F}_q$.

First, the use of Renes 1 to generalize rings of the form $\mathbb{F}_q[X]/(X^{n/k}-\zeta_{2k})$ will be described, where $\zeta_{2k}=\zeta^{n/k}$ is a primitive 2k-th root of unity, and $\zeta$ is a primitive 2n-th root of unity. This may be done by observing that the maps $$\psi_i: \mathbb{F}_q[X]/(X^{n/k}-\zeta_{2k}^{2i+1}) \to \mathbb{F}_q[X]/(X^{n/k}+1)$$

$$f_i \mapsto f_i(X/\zeta^{2i+1})$$

are isomorphisms for i=0, . . . , k−1 with inverse $\psi_i^{-1}: \tilde{f}_i \mapsto (\zeta^{2i+1} \cdot X)$. Therefore, $\psi_i$ may be applied, the algorithm of Renes 1 may be used, and then $\psi_i^{-1}$ may be applied to reach the desired effect.

Second, the Kronecker substitution-based method from Renes 1 may be combined with an NTT.

FIG. 1 illustrates a flow diagram of a method for multiplying two polynomials such as f, g∈ $\mathbb{F}_q[X]/(X^n+1)$ in a larger ring. The method 100 starts at 105. Then the method 100 receives first and second polynomials to be multiplied 110, that is, f, g∈ $\mathbb{F}_q[X]/(X^n+1)$. It is proposed to apply $NTT_k(f)$ and $NTT_k(g)$ for some positive integer k|n, mapping both polynomials to $$\prod_{i=0}^{k-1} \mathbb{F}_q[X]/(X^{n/k} - \zeta_{2k}^{2i+1}).$$

As a result, the first polynomial in the larger ring is mapped into k smaller third polynomials over k small rings based upon primitive roots of unity 115. Further, the second polynomial in the larger ring is mapped into k smaller fourth polynomials over k small rings based upon primitive roots of unity 120.

Moreover, the isomorphisms $\psi_i$ may be applied that map $NTT_k(f)$ and $NTT_k(g)$ into $$\prod_{i=0}^{k-1} \mathbb{F}_q[X]/(X^{n/k} + 1).$$

This results in k fifth polynomials by applying the isomorphism to the k smaller third polynomials and k sixth polynomials by applying the isomorphism to the k smaller fourth polynomials 125, 130.

Now the Kronecker substitution as described in Renes 1 may be applied to the k fifth polynomials and k sixth polynomials to perform the multiplication of the polynomials 135. This includes applying the Kronecker substitution as described in Renes 1 exactly k times on polynomials of degree n/k, instead of once on polynomials of degree n. The original setting of Renes 1 may be obtained by choosing k=1, showing that this is a natural generalization of Renes 1. Then, the inverse isomorphisms $\psi_i^{-1}$ is applied 140. Finally, the k inverted polynomials are mapped to a single polynomial in the larger ring 145. The method 100 then ends at 150.

The applications of $\psi_i$ and $\psi^{-1}$ require multiplying each coefficient of $f_i$ with some power of (often called twiddle factors). This would require k·n/k=n multiplications in $\mathbb{F}_q$. Often these can be made free by incorporating these multiplications into subsequent roots of unity that are necessary for the (symbolic) NTT, or by turning them into bit shifts through Kronecker substitution as used in Renes 1 (which then do not need explicit execution).

Further, applying $NTT_k$ has complexity n log(k) and applying Renes 1 to $\Pi_{i=0}^{k-1} \mathbb{F}_q[X]/(X^{n/k}+1)$ exactly k times has transformational overhead of complexity k·n/k·log (t). Therefore, the total cost is $$n \log(k) + n \log(t) = n \log(kt).$$

In the case where kt=n, a full depth NTT is retrieved, where k layers are regular NTTs and t layers are symbolic, and see that the transformational overhead has the same complexity.

These methods may be used in devices which use public-key co-processors to accelerate our crypto-libraries.

Method 100 may use existing fast and hardened arithmetic co-processors designed for known public-key cryptography such as ECC and RSA. As described above, the method applies number theoretic transform (NTT) techniques and roots of unity to the Kronecker setting which results in a faster and more efficient solution on processors designed for RSA and ECC calculations. This technical advancement allows for the various lattice based cryptographic functions and operations to be performed more quickly and efficiently using existing cryptographic processors.

Figure 2:
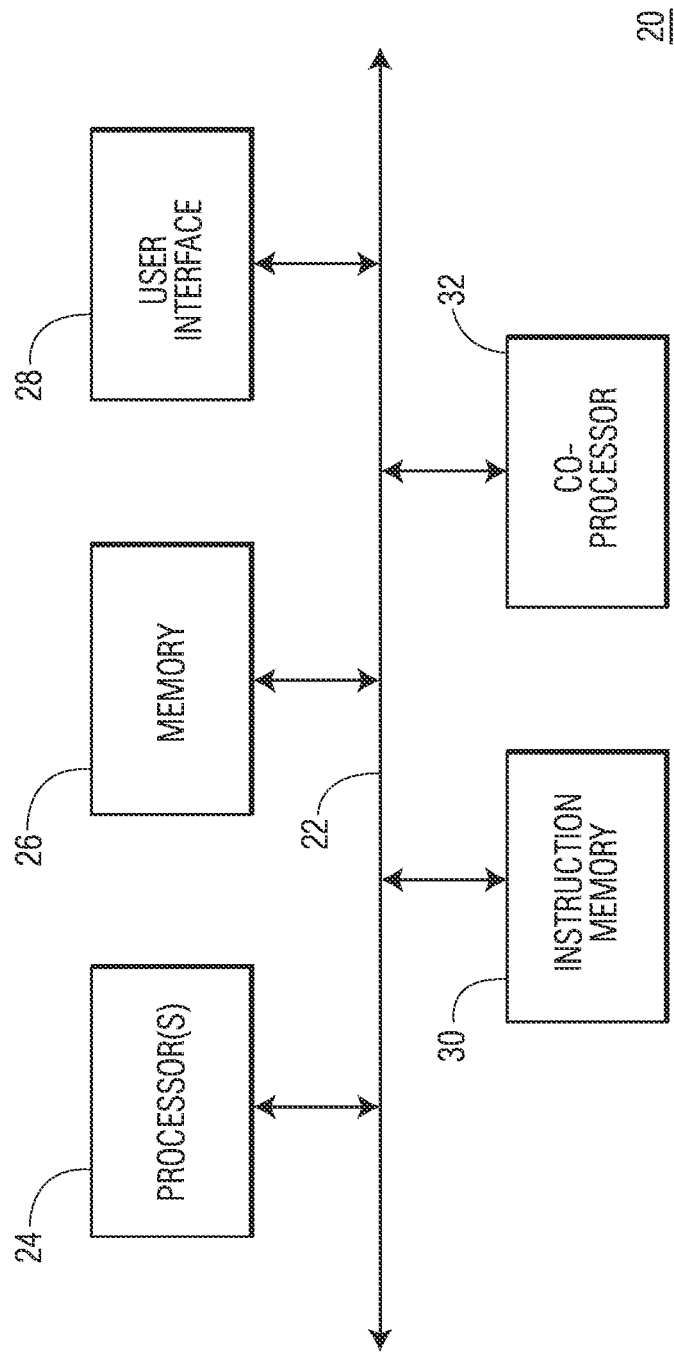
FIG. 2 illustrates, in block diagram form, data processing system including a co-processor for multiplying two or more polynomials in accordance with an embodiment.

FIG. 2 illustrates, in block diagram form, data processing system 20 including a co-processor 32 for multiplying two or more polynomials in accordance with the embodiments described herein. Data processing system 20 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 20 may include metal-oxide semiconductor (MOS) transistors fabricated using a conventional complementary metal-oxide semiconductor (CMOS) process. In another embodiment, data processing system 20 may include other transistor types, such as bipolar, and may be manufactured with a different process.

Data processing system 20 includes communication bus 22, processor(s) 24, memory 26, and cryptography co-processor 32. Bus 22 may be a conventional bus having a plurality of conductors for communicating address, data, and control information. In other embodiments, bus 22 may be an interconnect structure such as for example, a cross-bar switch or other form of interconnect system. Processor(s) 24 is bi-directionally connected to bus 22. Processor(s) 24 may include one or more of any type of processing element, a processor core, microprocessor, microcontroller, field-programmable gate arrays (FPGAs), application-specific integrated circuits (ASICs), digital signal processor, and the like. There can be any number of processors.

Memory 26 is bi-directionally connected to bus 22. Memory 26 can be one or more of any type of volatile or non-volatile memory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data.

User interface 28 is bi-directionally connected to bus 22 and may be connected to one or more devices for enabling communication with a user such as an administrator. For example, user interface 28 may be enabled for coupling to a display, a mouse, a keyboard, or other input/output device. User interface 28 may also include a network interface having one or more devices for enabling communication with other hardware devices external to data processing system 20.

Instruction memory 30 may include one or more machine-readable storage media for storing instructions for execution by processor(s) 24. In other embodiments, both memories 26 and 30 may store data upon which processor(s) 24 may operate. Memories 26 and 30 may also store, for example, encryption, decryption, and verification applications. Memories 26 and 30 may be implemented in a secure hardware element and may be tamper resistant.

Co-processor 32 is bi-directionally connected to bus 22. Co-processor 20 may be a special type of a co-processor optimized for running encryption/decryption security software according to the RSA, ECC, or Advanced Encryption Standard (AES) or other type of commonly used encryption algorithm. Accordingly, and in accordance with the described embodiments, co-processor 32 may be used to efficiently execute instructions for performing polynomial multiplications for post-quantum cryptography as discussed above and illustrated in the flowchart of FIG. 1. The algorithm executed on co-processor 32 may be used to encrypt/decrypt data and instructions in data processing system 20.

The polynomial multiplication method described herein provides a technological solution to improving ability to multiply two polynomials in rings of the form of $\mathbb{F}_q[X]/(X^n+1)$ as required in many post-quantum cryptographic systems. The polynomial multiplier uses a mapping function to map the polynomials to be multiplied into smaller polynomials over a plurality of rings that have a smaller order using primitive roots of unity. An isomorphism is used to transform these smaller polynomials back into a form over a ring $\mathbb{F}_q[X]/(X^{n/k}+1)$, and the multiplication of polynomials over this ring may be efficiently calculated using the methods described in Renes 1. As a result, the size of the polynomials may be reduced in size so to allow for more efficient uses of the available cryptographic co-processor. This allows for multiplication over a ring $\mathbb{F}_q[X]/(X^n+1)$ to be split into multiplications that may fit within the available cryptographic co-processor and greatly reduces the size of the multiplications required as described above. This is an improvement over other methods that allow for the use of available cryptographic co-processors to carry out small multiplications so that the polynomial multiplications may be carried out more efficiently.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A method for multiplying a first and a second polynomial in a ring $\mathbb{F}_q[X]/(X^n+1)$ to perform a cryptographic operation in a data processing system where q is a positive integer, the method for use in a processor of the data processing system, comprising:
receiving the first polynomial and the second polynomial by the processor;
mapping the first polynomial into k smaller third polynomials over k smaller rings based upon primitive roots of unity, where k is a positive integer;
mapping the second polynomial into k smaller fourth polynomials over the k smaller rings based upon primitive roots of unity;
applying an isomorphism to the k third polynomials resulting in k fifth polynomials;
applying the isomorphism to the k fourth polynomials resulting in k sixth polynomials;
applying a Kronecker substitution on the k fifth polynomials and the k sixth polynomials and perform the multiplication of the k fifth polynomials and the k sixth polynomials to produce a multiplication result;
applying an inverse of the isomorphism to the multiplication result to obtain the multiplication of the first polynomial and the second polynomial; and
mapping the k inverted polynomials to a single polynomial in the ring $\mathbb{F}_q[X]/(X^n+1)$, wherein the method allows an encryption or decryption operation using the two or more polynomials with integer coefficients to be performed on the processor for post-quantum cryptography.

2. The method of claim 1, wherein mapping the first polynomial into k smaller third polynomials over k smaller rings includes the following mapping of the ring $\mathbb{F}_q[X]/(X^n+1)$:

$$\mathrm{NTT}_k: \mathbb{F}_q[X]/(X^n+1) \to \Pi_{i=0}^{k-1} \mathbb{F}_q[X]/(X^{n/k}-\zeta_{2k}^{2i+1}),$$

where $\mathrm{NTT}_k$ is number theoretic transform and $\zeta_{2k}^{2i+1}$ is a primitive root of unity.

3. The method of claim 2, wherein mapping the first polynomial into k smaller third polynomials over k smaller rings includes the following mapping of the first polynomial f:

$$f \to (f(\zeta^1), \ldots, f(\zeta^{2n-1})).$$

4. The method of claim 2, wherein mapping the first polynomial into k smaller third polynomials over k smaller rings includes the following mapping of the first polynomial f:

$$f \to (f \bmod(X^{n/k}-\zeta_{2k}), \ldots, f \bmod(X^{n/k}-\zeta_{2k}^{2k-1})).$$

5. The method of claim 2, wherein applying a Kronecker substitution on the k fifth polynomials and the k sixth polynomials includes applying the Kronecker substitution k times on polynomials of degree n/k.

6. The method of claim 1, wherein applying an isomorphism $\psi_i$ includes a ring mapping:

$$\mathbb{F}_q[X]/(X^{n/k}-\zeta_{2k}^{2i+1}) \to \mathbb{F}_q[X]/(X^{n/k}+1); \text{ and}$$

a polynomial mapping:

$$f_i \to f_i(X/\zeta^{2i+1}).$$

7. The method of claim 1, wherein applying the inverse of the isomorphism $\psi_i^{-1}$ includes:

$$\psi_i^{-1}: \bar{f}_i \to \bar{f}_i(\zeta^{2i+1} \cdot X).$$

8. A data processing system comprising instructions embodied in a non-transitory computer readable medium, the instructions for multiplying a first and a second polynomial in a ring $\mathbb{F}_q[X]/(X^N+1)$ to perform a cryptographic operation in a processor, the instructions, comprising:
   instructions for receiving the first polynomial and the second polynomial by the processor;
   instructions for mapping the first polynomial into k smaller third polynomials over k smaller rings based upon primitive roots of unity, where k is a positive integer;
   instructions for mapping the second polynomial into k smaller fourth polynomials over the k smaller rings based upon primitive roots of unity;
   instructions for applying an isomorphism to the k third polynomials resulting in k fifth polynomials;
   instructions for applying the isomorphism to the k fourth polynomials resulting in k sixth polynomials;
   instructions for applying a Kronecker substitution on the k fifth polynomials and the k sixth polynomials and perform the multiplication of the k fifth polynomials and the k sixth polynomials to produce a multiplication result;
   instructions for applying an inverse of the isomorphism to the multiplication result to obtain the multiplication of the first polynomial and the second polynomial; and
   instructions for mapping the k inverted polynomials to a single polynomial in the ring $\mathbb{F}_q[X]/(X^N+1)$, wherein execution of the instructions allows an encryption or decryption operation using the two or more polynomials with integer coefficients to be performed on the processor for post-quantum cryptography.

9. The data processing system of claim 8, wherein mapping the first polynomial into k smaller third polynomials over k smaller rings includes the following mapping of the ring $\mathbb{F}_q[X]/(X^n+1)$:

$$\mathrm{NTT}_k: \mathbb{F}_q[X]/(X^n+1) \to \Pi_{i=0}^{k-1} \mathbb{F}_q[X]/(X^{n/k}-\zeta_{2k}^{2i+1}),$$

where $\mathrm{NTT}_k$ is number theoretic transform and $\zeta_{2k}^{2i+1}$ is a primitive root of unity.

10. The data processing system of claim 9, wherein mapping the first polynomial into k smaller third polynomials over k smaller rings includes the following mapping of the first polynomial f:

$$f \to (f(\zeta^{-1}), \ldots, f(\zeta^{2n-1})).$$

11. The data processing system of claim 9, wherein mapping the first polynomial into k smaller third polynomials over k smaller rings includes the following mapping of the first polynomial f:

$$f \to (f \bmod(X^{n/k}-\zeta_{2k}), \ldots, f \bmod(X^{n/k}-\zeta_{2k}^{2k-1})).$$

12. The data processing system of claim 9, wherein applying a Kronecker substitution on the k fifth polynomials and the k sixth polynomials includes applying the Kronecker substitution k times on polynomials of degree n/k.

13. The data processing system of claim 8, wherein applying an isomorphism $\psi_i$ includes a ring mapping:

$$\mathbb{F}_q[X]/(X^{n/l}-\zeta_{2k}^{2i+1}) \to \mathbb{F}_q[X]/(X^{n/k}+1); \text{ and}$$

a polynomial mapping:

$$f_i \to f_i(X/\zeta^{2i+1}).$$

14. The data processing system of claim 8, wherein applying the inverse of the isomorphism $\psi_i^{-1}$ includes:

$$\psi_i^{-1}: \bar{f}_i \to \bar{f}_i(\zeta^{2i+1} \cdot X).$$

* * * * *